United States Patent
Pace

[11] 3,832,972
[45] Sept. 3, 1974

[54] TIRE TRIMMING AND PAINTING DEVICE

[76] Inventor: Hubert Julian Pace, 8th & State St., Bowling Green, Ky. 42101

[22] Filed: July 30, 1971

[21] Appl. No.: 167,785

[52] U.S. Cl............ 118/2, 118/35, 118/316, 118/321, 118/326, 157/13
[51] Int. Cl............................................ B05c 5/00
[58] Field of Search............ 118/35, 326, 321, 316, 118/2; 157/13

[56] References Cited
UNITED STATES PATENTS

| | | | |
|---|---|---|---|
| 1,876,967 | 9/1932 | Krause et al. | 118/316 |
| 1,983,684 | 12/1934 | Strong | 118/35 |
| 2,192,130 | 2/1940 | Errig et al. | 157/13 |
| 2,524,489 | 10/1950 | Strong | 157/13 |
| 2,606,612 | 8/1952 | Dinnan | 157/13 |
| 2,613,635 | 10/1952 | MacWilliam | 118/316 |
| 2,770,216 | 11/1956 | Schock | 118/323 |
| 2,941,584 | 6/1960 | Glynn | 157/13 |
| 2,960,061 | 11/1960 | Whitbeck | 118/316 X |
| 3,075,574 | 1/1963 | Groves et al. | 157/13 |
| 3,276,422 | 10/1966 | McCoy | 118/321 |

*Primary Examiner*—John P. McIntosh
*Attorney, Agent, or Firm*—Cushman, Darby & Cushman

[57] ABSTRACT

A vehicle tire with protruding nibs rolls down a ramp and into the device and begins to be rotated thereby. Knife means facing into the direction of rotation of the tire are skimmed over the left sidewall, the tread, and the right sidewall of the rotating tire at least once to trim off the nibs. Then paint is preferably sprayed upon the tire sidewalls, whereupon the processed tire is ejected from the device by application of brake means, preferably in combination with bumping the tire being ejected from the rear with another tire entering the device for processing. Cycling of the device may be automatically controlled. In the spray-painting operation, black paint may be applied to one sidewall as white wall protector is applied to the other.

17 Claims, 10 Drawing Figures

PATENTED SEP 3 1974 3,832,972

INVENTOR
HUBERT JULIAN PACE

BY Cushman, Darby & Cushman
ATTORNEYS

INVENTOR
HUBERT JULIAN PACE

BY Cushman, Darby & Cushman
ATTORNEYS

TIRE TRIMMING AND PAINTING DEVICE

BACKGROUND OF THE INVENTION

When a tire is molded both initially and when retreaded or recapped (hot process), "nibs," like cat's whiskers, are formed on the molded exterior surfaces thereof in correspondence to the locations and shape of small conduits necessarily provided in most tire molds.

Some tires are sold with those nibs still protruding therefrom, but it is believed many among the tire-buying public associate the appearance of untrimmed nibs on a tire with lack of attention to finishing detail, rougher and perhaps less careful work, and, in short, a tire to be less preferred over one of similar price and apparent quality which has been trimmed.

So, many tire manufacturers and retreaders trim the nibs from their products to give them a finished appearance and a better chance in the marketplace.

For similar reasons, and to protect the tires before they are used, tire manufacturers and retreaders usually "paint" their product, with a black paint over black areas of the tire and a clear or sometimes bluish protective coating over the white wall side of the tire.

Apparatus in the prior art for trimming nibs has ranged from simple hand-held knives run over the tire's exterior, to complicated machinery. Likewise, painting apparatus has ranged from a brush and a bucket to automated spray booths.

On the manual end of the scale, the equipment is less expensive, but the output can be highly variable in quality and in quantity-per-time. The tasks involved are ones which it is becoming increasingly more difficult to find willing workers to do well.

On the automated end of the scale, the equipment available up until now has been too bulky and expensive and too much a mystery to maintain for most smaller manufacturers and independent retreaders.

More specifically, the prior art now known to the present inventor includes the following United States patents.

The patent to Groves et al, U.S. Pat. No. 3,075,574, issued Jan. 29, 1963, relates to an automatic tire trimming assembly. Tires are fed into the trimming area by a conveyor. When the tire drops into the trimming area, a limit switch 213 actuates a cam switch motor 214. The trimming cams then control all of the machine's operation by energizing the tire trimmers, the relating assembly and tire ejecting mechanism. The equipment is totally automatic after the operator puts the power switch on. No paint cycle is mentioned.

The Strong patent, U.S. Pat. No. 1,983,684, issued on Dec. 11, 1934, illustrates performing tire trimming and painting operations in one apparatus.

The patent to Bosomworth et al, U.S. Pat. No. 2,996,110 issued Aug. 15, 1961, discloses an automatic tire trimming apparatus. Tire 9 rolls down conveyor 3 and trips a switch that actuates a motor 19 to initiate the machine cycle.

The patent to Broden, U.S. Pat. No. 2,581,928 issued Jan. 8, 1952, although it relates to a wheel finishing machine, discloses a conveying system including an automatic in and out fed feature.

The patent to Lindemann, U.S. Pat. No. 2,603,290 issued July 15, 1952, discloses the use of oscillating knives for tire trimming apparatus.

The patent to Strong, U.S. Pat. No. 2,524,489 issued Oct. 3, 1950, illustrates an apparatus for trimming protuberances from tires. When the tire comes in contact with a limit switch 110, a timer motor is started. The cutting blades are oscillated as the cutting operation begins. After the tire makes one revolution, the cutting blades are retracted from the tire surface, and the lift roller 37 releases the tire to be removed from the machine.

The following patents disclose various other manual and automatic tire trimmers and groovers:

| | | |
|---|---|---|
| McLaughlin et al. | 2,034,662 | March 17, 1936 |
| Dinnan | 2,606,612 | August 12, 1952 |
| Wikle et al. | 2,815,073 | December 3, 1957 |
| Skinner | 2,863,506 | December 9, 1958 |
| Hawkinson | 2,945,534 | July 19, 1960 |
| Ebers | 3,260,297 | July 12, 1966 |
| Warnecke et al. | 3,262,483 | July 26, 1966 |

In this specification, no distinction is made between the terms "retread" and "recap;" for the purposes hereof, one is synonymous with the other.

SUMMARY OF THE PRESENT INVENTION

The present inventor, an independent retreader by trade, believes a compact, inexpensive and easy to maintain combined trimmer and painter can serve manufacturer and retreader, large or small, equally well and, in fact, improve the smaller manufacturer's and independent retreader's competitive position by making it feasible for them to have, many for the first time, the benefits of automated trimming and painting.

A vehicle tire with protruding nibs rolls down a ramp and into the device and begins to be rotated thereby. Knife means facing into the direction of rotation of the tire are skimmed over the left sidewall, the tread, and the right sidewall of the rotating tire at least once to trim off the nibs. Then paint is preferably sprayed upon the tire sidewalls, whereupon the processed tire is ejected from the device by application of brake means, preferably in combination with bumping the tire being ejected from the rear with another tire entering the device for processing. Cycling of the device may be automatically controlled. In the spray-painting operation, black paint may be applied to one sidewall as white wall protector is applied to the other.

The principles of the invention will be further hereinafter discussed with reference to the drawings wherein a preferred embodiment is shown. The specifics illustrated in the drawings are intended to exemplify, rather than limit, aspects of the invention as defined in the claims.

DETAILED DESCRIPTION OF THE PRESENTLY PREFERRED EMBODIMENTS

The basic components of the tire trimming and painting device 10 include a cabinet and frame 12, an input station 14, trimming apparatus 16, tire painting apparatus 18, tire rotating apparatus 20, tire braking apparatus 22, a tire output station 24 and a cycle control station 26.

In this discussion, some references will be made to particular dimensions in order to impart a more rapid understanding of the illustrated embodiment. For instance, in the example depicted, the device's cabinet 12 is generally rectangular, measuring about 36 inches wide, by about 42 inches long by about 55 inches high, including a 15 inch high drawer space 28 into which an open top drawer may be removably slidably disposed to catch the trimmings.

The cabinet includes a roof 29 of diagonally scored and domed sheet metal. The remainder of the cabinet is also made of sheet metal and the frame of steel channels.

The first side 30 and second side 32 of the cabinet are provided with removable panels, hinged doors 34 or the like to permit access to many of the working components of the device.

At the input end of the device, the cabinet is centrally provided with a slot 36, e.g. about 10 inches wide and about 39 inches high, beginning above the drawer space 28. At the output end of the device, the cabinet is centrally provided with a slot 38, e.g. also about 10 inches wide and about 39 inches high, and beginning above the drawer space 28.

The cabinet is completed by two laterally spaced, vertical inner side walls 40,42 extending flush with respect to the vertical sides of the slots 36,38 from the roof 29 down to just above the drawer space 28. The outsides of these walls 40,42 are visible from the sides of the device when the doors 34 are open.

The input station 14 (FIG. 4) includes a forwardly declining ramp 44 shown comprising two laterally spaced rails 46, together with a railing structure 48 projecting up at the opposite sides thereof. The rails 46 extend forwardly and downwardly a short distance into the cabinet through the opening 36 and terminate adjacent the nearest drive roll of the tire rotating apparatus 20. The rails 46 are so laterally extensive and closely spaced that a broad range of vehicle tires, e.g. of about 24–36 inch O.D. and about 4–8 inch tread width, will roll thereon, laterally supported by the railings 48. Where the rails 46 enter the cabinet, they are supported upon a frame element 50 shown constituted by a horizontal bar secured through the cabinet's sheet metal to the frame. The upper edge of the bar lies about 5 inches above the lower edge of the opening 36. The railing is secured to the frame at 52 and is preferably fabricated of box channel members welded at intersecting ends.

The ramp constituted by the rails 46 is provided intermediate its extent with a releasable chock mechanism 54 (FIGS. 4 and 5), in the instance depicted, shown comprising a bracket 56 mounted under one of the rails and supporting between and under the rails a chock element 58 forced toward a raised condition by compression coil springs 60 and intermittently retractable upon actuation of a compressed air-operated piston and cylinder arrangement 64 connected at one end to the chock and at the other end to the bracket 56. Compressed air temporarily releasing the chock is supplied through line 62 which is communicated to a source of compressed air and controlled via the cycle control station 26. The springs 60 raise the chock to a ramp-blocking condition as shown in between intermittent releasings of the chock.

Figures 1, 4, 5:
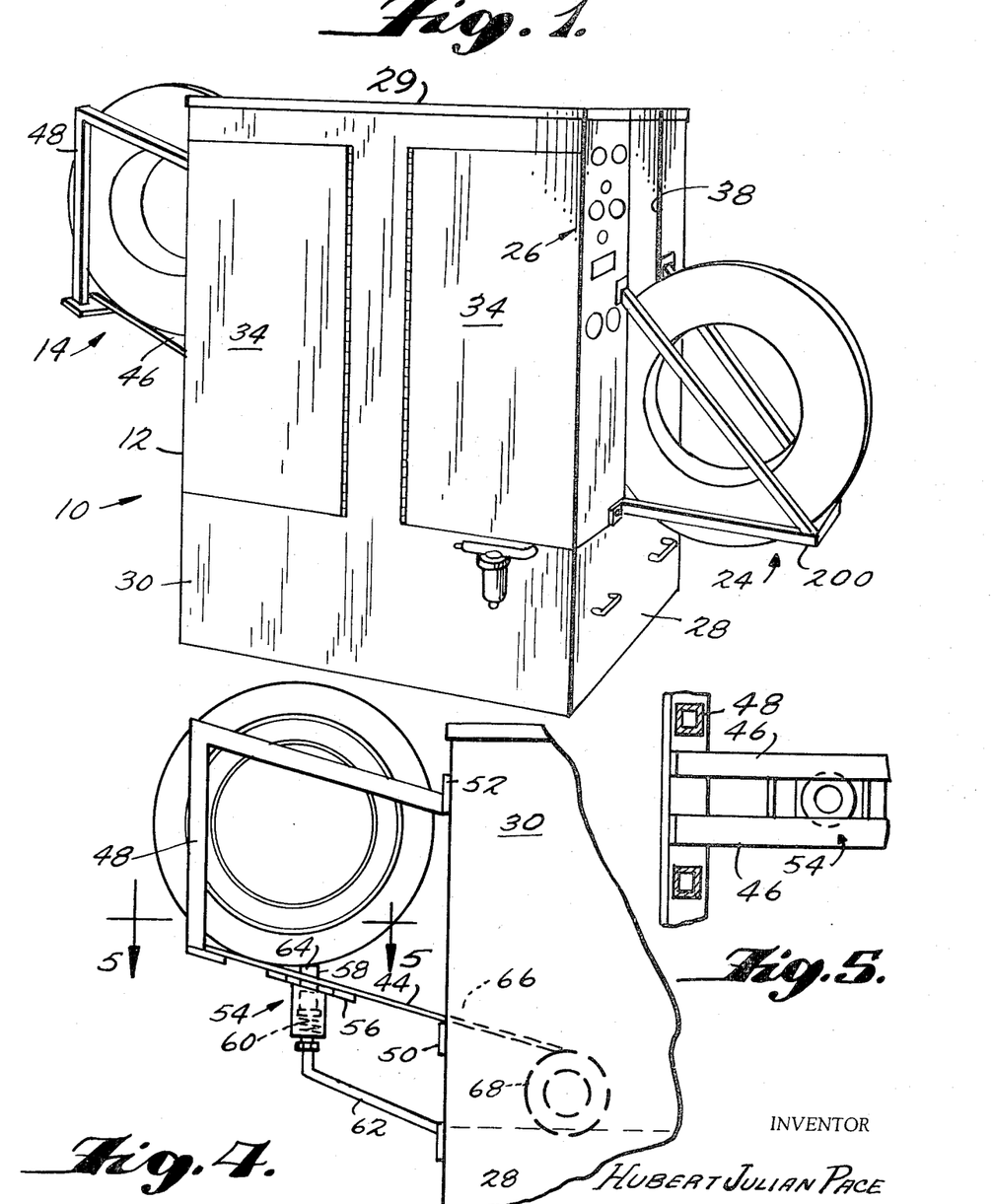
FIG. 1 is a perspective view of an embodiment of the device looking toward the output end, the second side and the top thereof.
FIG. 4 is a first-side elevation view of the input end of the device.
FIG. 5 is a fragmentary sectional view looking down from the line 5—5 of FIG. 4.
Figure 2:
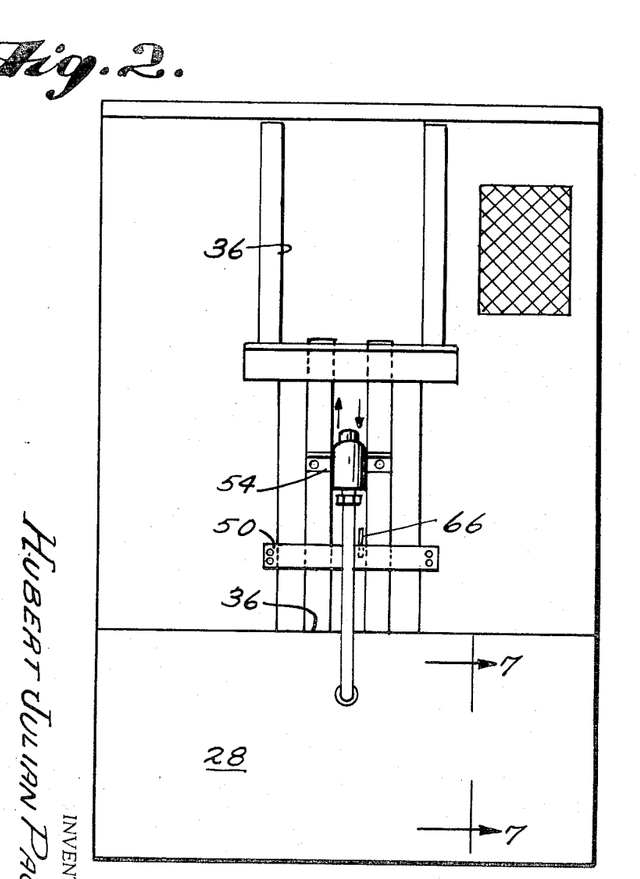
FIG. 2 is an elevation view of the device looking toward the input end thereof.
Figure 3:
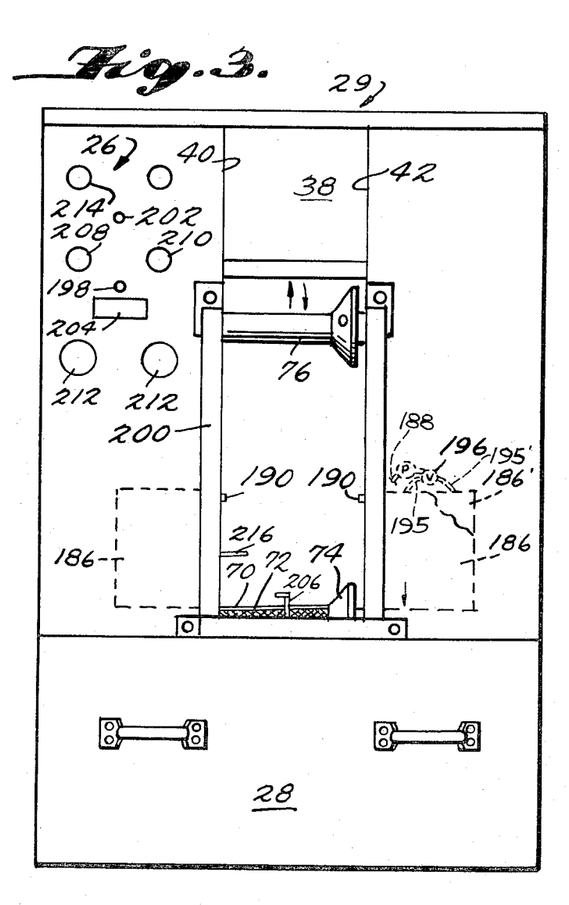
FIG. 3 is an elevation view of the device looking toward the output end thereof.
Figure 6:
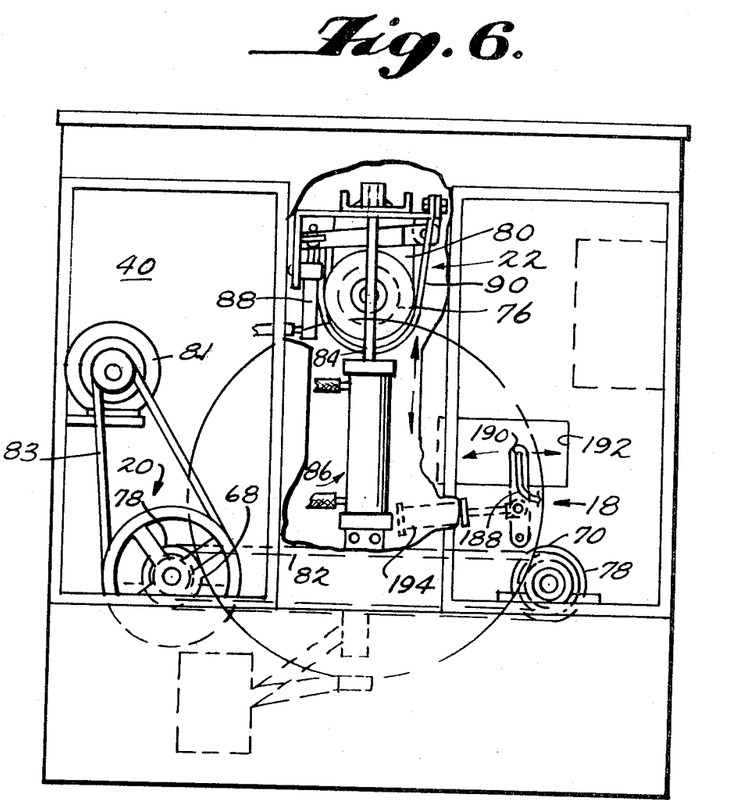
FIG. 6 is a first-side elevation view of the central portion of the device with the cabinet doors removed and the cabinet pillar and some additional elements sectioned away to expose interior details.
Figure 7:
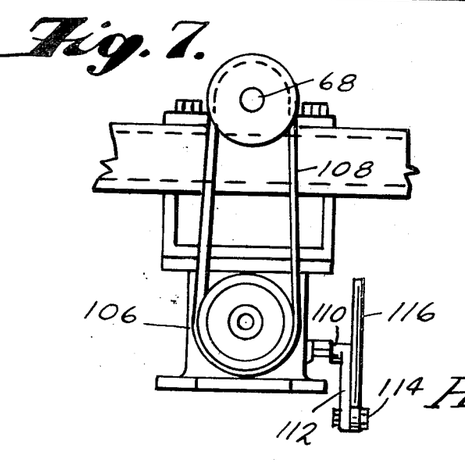
FIG. 7 is a fragmentary sectional view taken substantially along the line 7—7 of FIG. 2.

Accordingly, a worker or another conveyor may place a tire to be processed on the upper end of the input station ramp and allow it to roll down the ramp until it is stopped and supported by the chock in a holding or "on-deck" position. When the device 10 is ready to begin processing the tire, the chock 58 is pulled by operation of the piston and cylinder arrangement 64 and the tire rolls down the remainder of the ramp and into the ambit of the tire rotating and braking apparatus 20,22.

It should be noticed that an electrical trip switch 66 is mounted near the location where the ramp enters the cabinet in a position to be tripped by the tire passing thereover after the chock has been released.

The switch 66 is connected to the cycle control station 26 for initiating certain functions of the machine, provided it is tripped by a tire after the chock has been released. In one embodiment of the machine, the functions initiated by tripping the switch 66 include a raising of the brake roll of the braking apparatus 22 and a movement of the trimming apparatus 16 away from where the periphery of the tire will be located when the tire becomes disposed in the tire trimming and painting station.

As depicted, the tire rotating apparatus 20 at the tire trimming and painting station includes two longitudinally spaced, transversely horizontally extending rolls 68,70 covered with a high friction material 72. The latter may be constituted by strips of commercially available adhesive-backed stair tread material which consists of coarse, hard particles of ground glass, quartz or the like set in a binder of e.g. asphalt. The more important of the rolls so far as traction is concerned is the roll 70, nearer the output station. In many instances only the roll 70 need be covered with traction-enhancing material 72. Of course, the peripheral surfaces of either or both of the drive rolls could be knurled or otherwise treated to improve their traction characteristics as an alternative to coating or covering them with a foreign material.

Both of the drive rolls are generally exteriorly cylindrically curved except for a frustoconical portion 74 at the same extreme end of each. The effect provided by the frustoconical portions 74 appears to be achieved about as well if such portion is provided only on the roll 68 and the roll 70 is, instead, cylindrical throughout.

The main purpose of the rolls 68,70 is to rotate the tire being trimmed and painted regardless of the diameter or tread width of the tire, so long as these dimensions are within the design capacity of the device 10. However, both rolls have ancillary purposes, that of the roll 70 being to help kick a processed tire out into the output station and that of the roll 68 being to establish a location for the tire, laterally of the space between the walls 40,42. The roll 68 is assisted in this latter task by the brake roll 76 to be further described below. In designing the machine 10, the present inventor considered many roll designs and tried several before arriving at the combination 68,70,76. Other designs considered included entirely frustoconically tapered rolls and saddle-shaped rolls made of wood. None worked so well as the combination depicted (with a single proviso as to the elimination of the frustoconical region from all of the rolls but the drive roll 68).

The purpose of the frustoconical surface at one end of the drive roll 68 is to predispose the tire being rotated laterally toward one inner wall of the cabinet and thus to keep the tire from cocking or migrating, regardless of its diameter and width.

The drive rolls 68,70 are provided with e.g. pulleys 78 at their ends nearest the first side of the device 10, the pulleys 78 being driven from an electric motor 81 via endless drive belts 83.

Alternative rotational force transmitting means could be used. The drive rolls 68,70 begin to be rotated a set time after a tire has rolled down from an "on-deck" position, depressed the trip switch, rolled over the roll 68 and become supported between and upon the rolls 68,70.

The rolls 68,70 are positioned sufficiently far apart that the largest diameter tire to be processed by the machine will have no reasonable likelihood of rolling right on past the trimming and painting station, even if no previously processed tire lies in its path to retard it, and sufficiently close together that the smallest diameter tire to be processed by the machine will have no reasonable likelihood of falling down between the two drive rolls or becoming wedged between them. The exact spacing is a compromise in favor of the sizes of tires most likely to be processed by the machine.

The brake roll 76 is mounted in bearings 80 at both ends which normally allow the roll 76 to rotate freely due to engagement with the tread of the tire at the top of the tire. By preference, the working position of the roll 76 lies slightly toward the input end of the machine 10 from directly above the longitudinal axis of the tire when the tire is supported upon and being drive by the drive rolls 68,70. Also, the roll 76 is slightly skewed in a horizontal plane from parallelism with the rolls 68,70 in such sense as to bias the tire in the trimming and painting station toward the same inner side wall of the cabinet as the frustoconical surface on the roll 68 biases the tire toward. The skewing is on the order of a couple of degrees.

The bearings 80 lie outside the inner walls 40,42, the ends of the roll 76 protruding out through respective vertically elongated slots 82. The bearings 80 are mounted on the upper ends of the pistons 84 of compressed air operated piston and cylinder arrangements 86. The latter are so constructed that, upon the application of air pressure thereto, the roll 76 is raised to the upper end region of the slots 82, at which disposition the vertical distance between the level of the rolls 68,70 and the level of the raised roll 76 is greater than the outer diameter of the tires being processed by the machine. After the pistons 84 extend, air is released from the cylinders 86 and the roll 76 descends until it rests in rolling engagement with the tread of the tire which has rolled down the rails and into the trimming and painting station from the "on-deck" chock of the input station.

The cycle control station 26 so times the functions of the machine that the drive rolls 68,70 do not begin to rotate the tire in the trimming and painting station until the brake roll has descended into free rolling engagement with the tread of the tire in the trimming and painting station.

The brake roll mounting is shown equipped at at least one end with a compressed air cylinder 88 for operating a band brake 90. The particular brake is a commercial item and is but one example of means for terminating rotation of the roll 76 upon command. The cycle control station 26 which controls the supply of air to the cylinder 88 operates to apply the brake for a few moments after trimming and painting of the tire has been completed and power to the drive rolls 68,70 is cut off. The fact that the roll 76 preferably lies at least slightly behind the center of the tire in the trimming and painting station and the fact that inertia carries the drive rolls 68,70 forwardly after their power is cut off results in the tire being sharply reduced in rotational speed and boosted forwardly out of the trimming and painting station. This boost has sufficient magnitude to cause the tire to roll into the output station 24, even when not assisted with a push from behind by a subsequent tire entering the trimming and painting station.

The trimming apparatus 18 (FIGS. 8-10) is disposed generally below and between the drive rolls 68,70; it may pass through some of the space 26 occupied by the drawer.

Figures 8, 9:
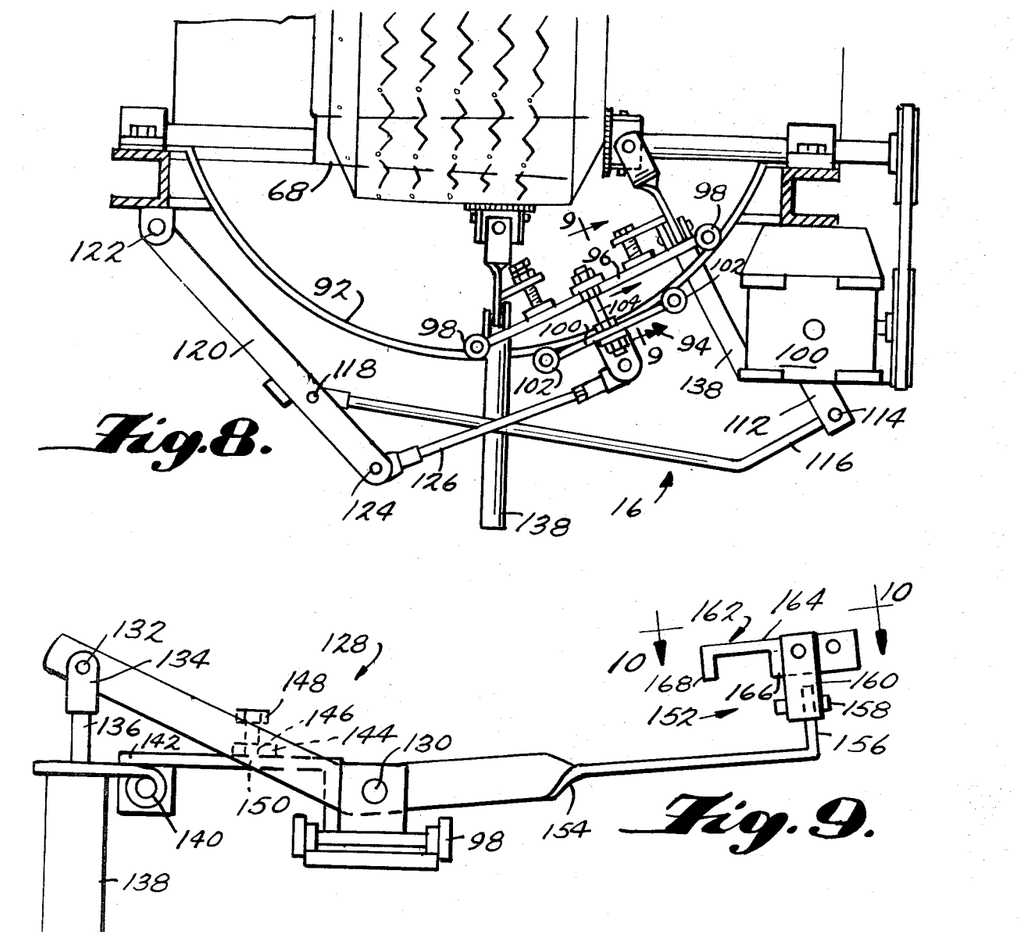
FIG. 8 is an elevation view, as seen from the output end, of the knife transport apparatus.
FIG. 9 is an elevation view, as seen through the second side, of the knife transport apparatus, the view being taken substantially along the line 9—9 of FIG. 8.
Figure 10:
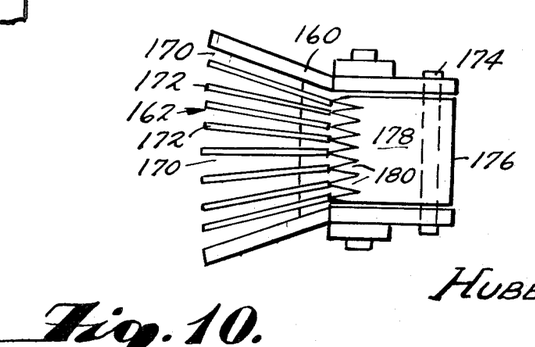
FIG. 10 is a top plan view of one knife and its mounting, taken substantially along the line 10—10 of FIG. 9.

In general, the trimming apparatus as depicted includes an upwardly arcuate track 92 which is, e.g. 1.5 inches wide and extends from a mounting on the frame below the inner wall 40 to a mounting on the frame below the opposite inner wall 42. A slide or carriage 94 is mounted upon the track for oscillation along the track from end-to-end thereof.

The carriage 94 which is illustrated includes a first frame portion 96 which rides upon the track 92 via four flanged wheels 98, two on each side, and a second frame portion 100 which rides on the underside of the track via four flanged wheels 102, also having two on each side. The two frame portions 96 and 100 are bolted together at 104 to constitute a carriage which rolls easily from end-to-end of the track, but which cannot derail even when subjected to relatively large torques due to movement of the trimming blades into and from trimming position and into and from engagement with the tire being trimmed.

On the second side of the device 10 in an end region of the drawer space 28 near the input end of the device, a gear reducer 106 is mounted. This device is driven from the shaft of the drive roll 68 via an endless belt 108. The output shaft 110 of the gear reducer mounts a crank arm 112 which is pivoted at 114 to one end of a rod 116. The opposite end of the rod 116 is pivoted at 118 to an intermediate portion of a second rod 120.

The latter has an upper end pivoted to the frame at 122 nearer the first side of the device 10 and has its lower end pivoted at 124 to the lower end of a third rod 126. The opposite end of the rod 126 is pivoted to the second frame portion 100 of the carriage. All of the pivots just described have horizontal axes which parallel the longitudinal axis of the device 10, i.e. the direction of progress of tires through the device.

As the crank 112 is rotated, the carriage oscillates back and forth on the track. The magnitude of the oscillation can be varied to move the trimming blades further or less far up and down the tire sidewalls by e.g. sliding the location of the pivot 118 on the rod 120 and/or substituting a track 92 with modified curvature. The track need not have circular curvature; it may be curved about a changing-length radius and/or about a moving center of curvature. Plotting or determining the locus of movement of the trimming blades mounted on the carriage should be within the limits of capability of those skilled in the art who desire to practice the invention which is disclosed herein.

By preference, two substantially alike trimming blade apparatuses 128 are pivotally mounted crosswise upon the first frame portion of the carriage 94 on horizontal pivots 130 which are generally horizontal and aligned with the directions of oscillation of the carriage along the track.

The end of each trimming blade apparatus arm 131 nearest the input end of the device 10 carries a pivot 132 which is parallel to the pivot 130. The pivot 132 mounts a yoke 134 secured on the upper end of the piston 136 of a pressurized air-operated piston and cylinder arrangement. The cylinder 138 thereof is pivoted at 140 at the upper end thereof to a bracket 142 secured on the carriage 94. The pivot 140 is parallel to the pivots 130 and 132. Accordingly, some of the movement of the piston during extension and retraction is accounted for in oscillation of the respective arm 131 about the respective pivot 132 and the remainder is accounted for by oscillation of the respective piston and cylinder arrangement 136,138 about the respective pivot 132. This structure is provided so a simple pivot may be provided at 140, rather than a pin and slot.

A horizontal tab 144 is provided on each arm 131 between the pivots 130 and 140. Each tab 144 is provided with an internally threaded, vertically oriented opening 146 which threadedly receives an adjusting screw 148. The downwardly directed nose 150 of the screw 148 is positioned vertically over an intermediate part of the respective bracket 142. The screw nose 150 by engagement with the bracket 142 determines how far toward the tire the trimmer knives are moved when the arms 131 are rotated to their counterclockwise extremes (FIG. 9 orientation).

Between the pivot 130 and the blade-carrying end 152, each knife in the embodiment illustrated undergoes a 90° twist (at 154) from being taller than thick (aligned in a vertical plane) to being shorter than wide (aligned in a generally horizontal plane). Near its end 152, each arm is bent up to create an upwardly directed flange 156. The flange mounts a pivot 158 which is generally horizontal and aligned with the longitudinal axis of the device 10.

Each pivot 158 mounts an upstanding trimming knife bracket 160 for total oscillation of at least 180° about the axis of the pivot 158, including the angular change in orientation provided due to oscillation of the carriage 94 along its track from one of its lateral extremes to the other.

The brackets 160 each include a cow-catcher-like lead-in device 162 for the respective cutter. Each lead-in device 162, in the preferred embodiment, consists of a piece of U-shaped steel channel cut through the back 164 thereof, partly through one side 166 thereof and fully through the other side 168 thereof with a plurality of cuts 170. The cuts 170 are then spread so the lead-in fans toward the input end of the device 10.

The ends of the channel member are extended toward the output end of the machine as laterally spaced bars 172. The ends of the bars farthest from the lead-in device are provided with lateral openings for accommodating a knife-mounting bolt 174. Each bolt 174 mounts a trimming knife blade 176 which comprises a flat body 178 with mounting provisions and a plurality of serrated teeth 180 which face the respective lead-in device. The individual teeth 180 are in longitudinal alignment with the adjacent ends of the convergent lead bars 182 of the lead-in device 162. The blades 176 are commercially available as discardable blades for hand-held tire trimming tools.

When a tire becomes positioned at the trimming and painting station, the brake roll descends into contact with the tread of the tire, the pistons 136 are retracted to bring the lead-in devices and trimming blades into light engagement with the exterior peripheral surface of the tire. The two lead-in device 162/trimming blade 176 sets are each automatically disposed laterally spaced from one another, in tangential engagement with the tire. The tire is then rotated by the drive rolls in a sense to bring the exterior surface thereof toward the lead-in devices and trimming blades. The blades 176 are sufficiently laterally spaced that when the blade at one side is moving tangentially relative to one sidewall of the tire, the other blade is moving tangentially relative to the tread of the tire and when the first-mentioned blade is beginning to move over the tread of the tire, the second-mentioned blade is beginning to move up the opposite sidewall of the tire. This orientation gives double trimming coverage for the tread area of the tire where protrusions are often more numerous. (Untrimmed protrusions in the tread area can cause increased road noise and decreased ride smoothness until they wear off.)

In certain instances better results may be obtained when the tire is caused to begin rotating before rather than after the knives are raised into engagement with the exterior periphery of the tire. As explained hereinbefore, the extent of transverse travel of the carriage 94 (and therefore the extent of movement of the knife blades up and down the sidewalls of the tire) can be varied to take into account the location of protrusions to be trimmed. (If there are no protrusions far up the tire sidewall near the rim beads, e.g. when the tire is a retread, the trimming blades need not proceed up that far.)

The major remaining component of the depicted device 10 is the painting apparatus 18.

In the device depicted, painting does not require as long a time as trimming, so the cycle control station 26 does not actuate the painting apparatus 18 until the trimming is e.g. nearly completed. By that time, most of the protrusions have been eliminated and the tire will make at least one revolution in order to get both sidewalls coated with paint. By preference, the paint used is a water-based emulsion of rubbery polymer, pigmented black when the sidewalls to be coated are black and otherwise pigmented or nearly colorless when the sidewalls to be covered are not black or vary in color from tire-to-tire of the tires being processed through the device 10.

Also by preference, the painting apparatus includes at least one atmospheric pressure-level paint reservoir 186 at each side of the device, near the output end, mounted between the cabinet doors and inner walls. The reservoirs 186 are each equipped with a siphon-type outlet tube 188 leading to an air pressurized spray head 190 aimed through a slot 192 in the cabinet inner wall. Each slot 192 is sufficiently wide to expose a radially complete segment of the entire respective sidewall of the tire.

The spray heads 190 are mounted on flexible tubes leading through the pressurizing assembly to the siphon tubes 188. That is done to accommodate movement of the spray heads radially during their operation (when the tire is rotated through more than one complete revolution during paint application) in order to insure complete coverage of the sidewalls from a small spray head. This oscillation is provided, in the embodiment depicted, by mounting the spray heads on the one ends of air pressure-operated piston and cylinder arrangement 194. The opposite ends of the arrangements 194 are mounted on the frame of the device 10. Of course, the spray heads could be fan-shaped so they covered the whole radial extent of the tire sidewalls without need for being oscillated.

Where the device 10 is equipped with two reservoirs 186, both would usually be filled with black paint when only black sidewall tires are to be processed, but with one reservoir of black paint and one of clear protective coating when only white sidewall tires or an intermixture of white and black sidewall tires is to be processed. In such latter instances, the operator must pay sufficient attention to the line of incoming tires to be processed to insure that the tire's white sidewall, if any, faces the side of the machine equipped to spray the clear protective coating, rather than the black paint.

Where the device will usually process an intermixture, as an option, one side of the device may be equipped with an additional reservoir 186' connected to the pressurization line 188 on that side via a line 195 which Y's at a valve 196 with the comparable line 195 from the reservoir 186 on that side. Then, switch means 198 may be provided for the operator to connect one or the other of the reservoirs 186, 186' on the same side to the respective spray head, depending upon which color of sidewall tire is next being processed. Generally, it is a waste of effort and materials to keep changing back and forth between reservoirs 186 and 186' on the same side, even though the paint spraying apparatus is preferably set up so it will blow its flexible line and spray head clean of paint during each cycle. Accordingly, it is suggested that tires to be processed by the device equipped with the optional additional reservoir to be grouped by sidewall color and processed with as few switchings as possible consistent with getting the work done without undue backlogs.

It would be within the purview of the invention, however, to equip the valve 196 with an electronic sensor-/actuator device (such are commercially available) for automated switching between paint reservoirs based on a sensation of the sidewall color of tires being processed.

As described above, once the tire at the trimming and painting station has been trimmed and painted, the brake is applied, kicking the processed tire out into the tire output station 24 which consists of a rack 200 welded of channel members and dimensioned for receiving the kicked-out tire for manual or automatic collection, e.g. to the cargo compartment of a delivery truck or to a storage area.

The following is a typical sequencing of a tire through the device 10.

The input station chock trips near the end of the previous cycle to start the tire to be processed next rolling down into the machine. Concurrently, the brake is applied to the rotating previously processed tire. The incoming tire trips the switch actuator located between the rails of the input station at the entrance to the cabinet, lowering the knives away from the ambit of where the exterior peripheral surface of the tire will be when the tire becomes disposed at the trimming and painting station (by extending the pistons 136) while the brake roller ascends to its upper limit. As the tire to be processed rolls into the trimming and painting station, it nudges the outgoing tire to transfer momentum thereto. Then the brake roller descends onto the tread of the tire to be processed, as the knives move up into tangential engagement with the exterior peripheral surface of the tire. Typically, one knife moves up against the right sidewall of the tire and the other knife moves up against the tire tread near the right edge thereof. The drive rollers begin to rotate the tire and the cradle (typically) begins to move to the left. After about one complete cycling of the cradle to one extreme, back through where it started, to the opposite extreme and again to the starting point, the paint sprays kick in and make one cycle from bead to tread as the tire makes, e.g. half a dozen additional revolutions and the knives complete more of at least one additional cycle. Each time a knife and associated lead-in device move halfway laterally off the tire tread while proceeding flatwise against the tread toward a sidewall, the lead-in device and knife assembly rotate about the respective pivot 158 into flatwise engagement with that sidewall to follow the contour of the same. When a knife assembly in engagement with a sidewall overhangs the same in proceeding toward the tread, the reverse occurs to place that knife assembly in flatwise contact with the tire tread. The rotation at 158 is induced by contact of the particular blade assembly with the tire exterior peripheral surface, so the two knife assemblies rotate at 158 independently of one another. The protrusions are trimmed by a shearing action of the sharpened V-shaped areas between adjacent knife teeth. The protrusions are guided toward these sharpened areas and flatwise contact of the knife assemblies with the tire exterior peripheral surfaces is assisted by engagement of the lead-in devices with the tires.

Upon conclusion of the painting cycle, the reservoirs are cut off from the spray heads and the air pressurized spray lines and spray heads are blown free of paint. The spray heads, if movably mounted, are returned by the piston and cylinder mounting means thereof to their "start" position, the tire rotation brake is applied, the chock trips again (slightly before the brake is applied), and the next cycle begins.

By preference, the compressed air-operated cylinders are operated with 50 p.s.i.g. air pressure, and the paint sprays are operated with 100 p.s.i.g. air pressure. Other pressures could be used and, as to the air pressure-operated cylinders, other fluid power mediums, such as hydraulic oil, could be used, or other means such as solenoids could replace some or all of the pressurized fluid piston and cylinder arrangements. The set-up as depicted is preferred, because it avoids the use of sometimes troublesome electrical or electromechanical components in each instance where the pressurized air-operated piston and cylinder arrangements are used.

Painting of trimmed tires is not always desired. Accordingly, the device 10 may be provided with a switch 202 which simply deactivates the painting apparatus 18 so long as it is in an "off" position.

The cycle timing station 26 may include means for adjusting the total cycle time or any component thereof. Generally, a complete cycle for processing a tire on the machine 10 lasts for about 40–60 seconds.

If a drawer is fitted in the drawer space 28 to catch protrusions trimmed from the tires being processed, it may be periodically pulled out and its contents sent for reprocessing into tire rubber.

The operator panel on the device 10 may be provided with a cycle totalizer 204 actuated e.g. by a trip switch 206 located e.g. in the output station in position to be tripped by outgoing tires. The operator panel may further be provided with such other instrumentation as is considered necessary, such as an on/off switch 208 for the whole device, a corresponding light 210, pressure gauges 212 for the pressurized air supply and a cycle timer 214 for indicating and/or allowing adjustment of the cycle duration.

The motor used for powering the drive rolls and carriage oscillation in the preferred embodiment is a 1,500 r.p.m. electric motor equipped, as are the drive rolls, with 9 inch pulleys. The reduction gearing for oscillating the carriage on which the trimming apparatus is mounted, in the illustrated example, provides a reduction of 50 to one.

A microswitch 216 may be provided adjacent the trimming and painting station for tripping by a tire entering that station. Such a switch 216 is connected to the cycle control station to abort a cycle if no tire is depressing the switch 216 when a tire to be processed is intended to be located in the trimming and painting station.

The device could be modified so as to have a single knife assembly mounted on the carriage for sufficiently great transverse and vertical movement as to completely cover the area needed to be trimmed, obviating the need for a laterally adjacent knife assembly.

It should now be apparent that the tire trimming and painting device as described hereinabove possesses each of the attributes set forth in the specification under the heading "Summary of the Present Invention" hereinbefore. Because the tire trimming and painting device of the invention can be modified to some extent without departing from the principles of the invention as they have been outlined and explained in this specification, the present invention should be understood as encompassing all such modifications as are within the spirit and scope of the following claims.

What is claimed is:

1. Tire processing apparatus including:
   means for rotating a tire generally about the longitudinal axis thereof at a work station;
   first and second cutting knife means;
   support means for the cutting knife means for moving the cutting knife means transversely of the tire being rotated, in tangential trimming engagement with the exterior peripheral surface of the tire being rotated, including the tire tread and at least the portions of the tire sidewalls which lie adjacent the tire tread, the support means for the cutting means including:
   a. an upwardly arcuate track extending transversely to and astride the path of movement of the tread of the tire being processed, below said work station;
   b. carriage means mounted on said track for oscillation therealong;
   c. powered means mounted on said apparatus and linked to said carriage means for oscillating the carriage means back and forth along said track; and
   d. first and second means respectively mounting said first and second cutting knife means on said carriage means including means for retracting the cutting knife means from contiguity with the tire;
   the second cutting knife means, mounted further along said carriage means than the first cutting knife means via a said second cutting knife means support means; the second cutting knife means and the second cutting knife means support means being respectively substantially identical to the first cutting knife means and the first-mentioned knife means support means;
   said first-mentioned and second cutting knife support means being so spaced from one another along said carriage means that when one cutting knife means is in contact with the tread of the tire being processed near one lateral extreme of the tread, the other cutting knife means is in contact with that sidewall of the tire being processed which adjoins the tread at said one lateral extreme and vice versa;
   means mounted on said apparatus for applying paint to at least one sidewall of the tire being rotated; and
   timing and control means connected to the cutting knife means mounting means and to the paint applying means for initiating application of paint to the tire being processed after the first and second cutting knife mean have collectively made at least one complete sweep over the sidewall and tread portions of the tire which protrusions are to be trimmed.

2. The tire processing apparatus of claim 1 wherein the paint applying means comprises a supply conduit for paint; pressurization means intersecting said conduit; spray head means on said conduit downstream from said pressurization means; and mounting means for disposing said spray head for exposure to sprayed paint of a radially extensive, angularly narrow band of said at least one sidewall of the tire being rotated, so that substantially all of the said sidewall may be covered with paint as the tire is rotated with the paint applying means operating.

3. The tire processing apparatus of claim 2 wherein the mounting means for the spray head includes a fluid pressure operated extensible/retractable piston and cylinder arrangement having one end secured to said apparatus and the other end mounting said spray head for movement radially of said sidewall.

4. The tire processing apparatus of claim 2 further including a second paint applying means, identical to the first-mentioned paint applying means, but disposed on said apparatus for applying paint to the other sidewall of said tire.

5. The tire processing apparatus of claim 4 wherein the conduit of at least one of the paint applying means is communicated upstream of the intersection of said pressurization means with a reservoir of paint maintained at substantially atmospheric pressure, the respective conduit being configured to supply paint from said reservoir to the respective pressurization means through siphoning action.

6. The tire processing apparatus of claim 5 wherein the conduit communicating between said reservoir and the respective spray head is branched into two arms at said pressurization means; a valve is incorporated in said conduit where it branches for permitting selection of which arm of said conduit upstream of said pressurization means is communicated through said pressurization means to said conduit downstream of the respective pressurization means and thus to said respective spray head; and a second reservoir of paint maintained at substantially atmospheric pressure, the other arm of said conduit being communicated to said second reservoir for supplying paint to the respective pressurization means through siphoning action, whereby the respective sidewall of successively processed tires may be coated with either of two paints, for instance, black wall and white wall protective coatings.

7. The tire processing apparatus of claim 2 further including switch means for selectively rendering the paint applying means operative and inoperative so tires may be trimmed as well as painted, or trimmed but not painted, using the apparatus, at the selection of the operator of the apparatus.

8. The tire processing apparatus of claim 1 further including switch means for selectively rendering the paint applying means operative and inoperative so tires may be trimmed as well as painted, or trimmed but not painted, using the apparatus, at the selection of the operator of the apparatus.

9. The tire processing apparatus of claim 1 further including means for accepting the tire into said apparatus for processing, means for ejecting the tire from said machine after processing; and timing and control means for adjustably establishing the beginning, duration and ending of the operation of the tire accepting means, tire rotating means, tire ejecting means, the cutting knife support means and the paint applying means.

10. Tire processing apparatus including:
means for rotating a tire generally about the longitudinal axis thereof at a work station;
first and second cutting knife means;
support means for the cutting knife means for moving the cutting knife means transversely of the tire being rotated, in tangential trimming engagement with the exterior peripheral surface of the tire being rotated, including the tire tread and at least the portions of the tire sidewalls which lie adjacent the tire tread, the support means for the cutting means including:

a. an upwardly arcuate track extending transversely to and astride the path of movement of the tread of the tire being processed, below said work station;

b. carriage means mounted on said track for oscillation therealong;

c. powered means mounted on said apparatus and linked to said carriage means for oscillating the carriage means back and forth along said track; and d. first and second means respectively mounting said first and second cutting knife means on said carriage means including means for retracting the cutting knife means from contiguity with the tire;

the second cutting knife means, mounted further along said carriage means than the first cutting knife means via a said second cutting knife means support means; the second cutting knife means and the second cutting knife means support means being respectively substantially identical to the first cutting knife means and the first-mentioned knife means support means;

said first-mentioned and second cutting knife support means being so spaced from one another along said carriage means that when one cutting knife means is in contact with the tread of the tire being processed near one lateral extreme of the tread, the other cutting knife means is in contact with that sidewall of the tire being processed which adjoins the tread at said one lateral extreme and vice versa;

means mounted on said apparatus for applying paint to at least one sidewall of the tire being rotated; and timing and control means connected to the cutting knife means mounting means and to the paint applying means for initiating application of paint to the tire being processed after the first and second cutting knife means have collectively made at least one complete sweep over the sidewall and tread portions of the tire from which protrusions are to be trimmed;

tire rotating means includes two substantially parallel, generally horizontal rollers spaced more closely to one another than the length of the outer diameter of the tires to be processed by said apparatus; and means for rotating at least one of said rollers about the longitudinal axis thereof, whereby said tire may rest upon both said rollers with the tread thereof in driven engagement with the radially outer peripheral surface of the at least one rotated roller, defining a work station position of the tire being processed;

means confining the tire being processed to a substantially upright condition upon said rollers;

the confining means comprising two upright, generally vertical walls axially spaced from one another with respect to said rollers by a distance which exceeds the axial thickness of the tire being processed by an insufficient amount to permit the tire being processed to depart from a generally upright condition; and means for biasing the tire being processed toward contact with one of said walls to maintain the tire being processed in a substantially upright condition.

11. The tire processing apparatus of claim 10 wherein the paint applying means comprises a supply conduit for paint; pressurization means intersecting said conduit; spray head means on said conduit downstream from said pressurization means; and mounting means for disposing said spray head for exposure to sprayed paint of a radially extensive, angularly narrow band of said at least one sidewall of the tire being rotated, so that substantially all of the said sidewall may be covered with paint as the tire is rotated with the paint applying means operating.

12. The tire processing apparatus of claim 11 wherein said wall means is slotted in the region where paint is to be applied to the tire sidewall band, wherein the paint applying means is disposed exteriorly of said sidewall with the spray head thereof aimed toward the work station through said slotted wall region.

13. The tire processing apparatus of claim 12 wherein the mounting means for the spray head includes a fluid pressure operated extensible/retractable piston and cylinder arrangement having one end secured to said apparatus and the other end mounting said spray head for movement radially of said sidewall.

14. The tire processing apparatus of claim 12 further including a second paint applying means, identical to the first-mentioned paint applying means, but disposed on said apparatus for applying paint to the other sidewall of said tire.

15. The tire processing apparatus of claim 14 further including cabinet means enclosing the described elements and having means defining a tire inlet slot at one end thereof and a tire output slot at the opposite end thereof; said cabinet including door means on both sides thereof for permitting access to the paint applying means, brake means, and the ends of the rollers and additional roller.

16. The tire processing apparatus of claim 15 wherein the conduit of at least one of the paint applying means is communicated upstream of the intersection of said pressurization means with a reservoir of paint maintained at substantially atmospheric pressure, the respective conduit being configured to supply paint from said reservoir to the respective pressurization means through siphoning action.

17. The tire processing apparatus of claim 16 wherein the conduit communicating between said reservoir and the respective spray head is branched into two arms at said pressurization means; a valve is incorporated in said conduit where it branches for permitting selection of which arm of said conduit upstream of said pressurization means is communicated through said pressurization means to said conduit downstream of the respective pressurization means and thus to said respective spray head; and a second reservoir of paint maintained at substantially atmospheric pressure, the other arm of said conduit being communicated to said second reservoir for supplying paint to the respective pressurization means through siphoning action, whereby the respective sidewall of successively processed tires may be coated with either of two paints, for instance, black wall and white wall protective coatings.

* * * * *